(12) United States Patent
Nyman et al.

(10) Patent No.: US 6,267,900 B1
(45) Date of Patent: Jul. 31, 2001

(54) METHOD AND APPARATUS FOR ADJUSTING THE BOUNDARY SURFACE BETWEEN TWO CONTROLLABLY FLOWING AND MUTUALLY SEPARABLE AND FOR CONDUCTING BOTH SOLUTIONS OUT OF THE SEPARATION PART

(75) Inventors: Bror Nyman, Vanha-Ulvila; Launo Lilja; Stig-Erik Hultholm, both of Pori; Juhani Lyyra; Raimo Kuusisto, both of Espoo; Petri Taipale, Vantaa, all of (FI); Timo Saarenpää, Santiago (CL)

(73) Assignee: Outokumpu Technology Oyj, Espoo (FI)

( * ) Notice: Subject to any disclaimer, the term of this patent is extended or adjusted under 35 U.S.C. 154(b) by 0 days.

(21) Appl. No.: 09/171,596

(22) PCT Filed: Apr. 29, 1997

(86) PCT No.: PCT/FI97/00253

§ 371 Date: Mar. 16, 1999

§ 102(e) Date: Mar. 16, 1999

(87) PCT Pub. No.: WO97/40901

PCT Pub. Date: Nov. 6, 1997

(30) Foreign Application Priority Data

Apr. 30, 1996 (FI) .................................................. 961832

(51) Int. Cl.⁷ ..................................................... B01D 11/04
(52) U.S. Cl. ........................ 210/800; 210/634; 210/511; 210/248; 210/197; 210/532.1; 210/540

(58) Field of Search .................................. 210/634, 511, 210/241, 242.1, 242.3, 248, 513, 521, 532.1, 538, 540, 800, 923, 197

(56) References Cited

U.S. PATENT DOCUMENTS

| | | | | |
|---|---|---|---|---|
| 4,015,629 | * | 4/1977 | Morgan et al. | 137/578 |
| 4,212,740 | * | 7/1980 | Greene | 210/169 |
| 5,143,605 | * | 9/1992 | Masciarelli | 210/169 |
| 5,275,721 | * | 1/1994 | Mathews | 210/169 |
| 5,413,707 | * | 5/1995 | Shatilov | 210/169 |
| 6,083,400 | * | 7/2000 | Nyman et al. | 210/634 |

* cited by examiner

*Primary Examiner*—Robert Popovics
(74) *Attorney, Agent, or Firm*—Morgan & Finnegan LLP (57) ABSTRACT

The invention relates to a method for adjusting the boundary surface between the two mutually separable solutions in liquid—liquid extraction at the discharge end of the separation part and for preventing the aeration of the solutions when discharging them from the separation part, so that the overflow height of the settled, lighter organic solution is maintained constant. In order to adjust the boundary surface in between the mutually separable solutions, the overflow height of the heavier aqueous solution is adjusted by conducting the settled aqueous solution from down upwards through tubular elements, in which case the height of these overflow pipes can be adjusted. The aeration of the solutions when discharging them from the separation part is prevented by conducting the solutions into transfer pipes through covered, shaft-like weir boxes that are deeper than the discharge end. The invention also relates to an apparatus whereby the boundary surface between the solutions is adjusted and the aeration prevented.

12 Claims, 6 Drawing Sheets

100 # METHOD AND APPARATUS FOR ADJUSTING THE BOUNDARY SURFACE BETWEEN TWO CONTROLLABLY FLOWING AND MUTUALLY SEPARABLE AND FOR CONDUCTING BOTH SOLUTIONS OUT OF THE SEPARATION PART

FIELD OF THE INVENTION

The invention relates to a method for adjusting the boundary surface or the location of the dispersion zone in the vertical direction in liquid—liquid extraction, in between two solutions that are mutually separable owing to gravity, and to a method for conducting the separated solutions out of the space where the separation takes place, advantageously so that an aeration of the solutions in the transfer step is prevented. The invention also relates to an apparatus for realizing the method.

BACKGROUND OF THE INVENTION

In large extraction plants, such as copper extraction, the adjusting of the solution boundary surfaces and the discharging of the solutions are combined by adopting two collecting chutes provided with solution overflows, which chutes extend vertically over the whole final end of the separation part. Generally there are used two attached chutes, the first of which—in the solution flow direction—is a fixed chute collecting the lighter organic solution as overflow, and the latter is a chute collecting the aqueous solution, provided with an adjustable overflow edge. The heavier solution, i.e. the aqueous solution, is conducted from underneath both chutes through a duct formed in between the chute bottoms and the separation part bottom. From this duct, the aqueous solution turns up and flows in the form of a U-turn in the collecting chute, in a direction that is opposite to the original flowing direction.

The adjustable overflow of the aqueous solution is formed of an outer edge of an aqueous solution chute, known in the prior art, which is constructed of a wall plate extending up to a given height and of another plate moving against it. This structure, provided with a horizontal overflow edge, serves as the basic overflow level, arranged at a height which it is unnecessary to go below from the adjusting point of view. The adjusting range proper locates above this level, and it is taken care of by means of a movable plate part, the overflow edge of which is likewise maintained in horizontal position.

The above described aqueous solution chutes provided with overflow edges include some drawbacks. Two plates moving against each other cannot be made compact, but a remarkable part of the overflow, about 10–40% thereof, passes along some other route than over the overflow edge. Therefore the adjusting of the phase boundary surface works properly only when the solution feeds surpass about half of the amount for which the extraction plants are designed. Moreover, when driving down the process, the above described overflow causes a solution flow to the next process step and thus weakens the extraction results in connection with the next drive up. There is also the danger that the boundary surfaces of the separation parts fluctuate, in which case a phase dispersion carrying impurities and located in between pure phases is transported along with the separated solutions.

SUMMARY OF THE INVENTION

By means of the method and apparatus of the present invention, we have now attempted to avoid the above described drawbacks, and the object is to improve the accuracy in the adjusting of the boundary surface in between the solutions, and at the same time prevent an aeration of the solutions and thus to improve the controllability of the flow of the separating solutions. A good adjustability is particularly important with liquid—liquid extraction, when driving the process up an down. According to the invention, the boundary surface between the solutions is adjusted by adjusting the overflow surface, so that in the bottom part of the aqueous solution end, there are installed several vertically adjustable tubular members, whereto the aqueous solution flows from the downwardly direction and is discharged to the surrounding aqueous solution chute through the top element of the tubular member. The aeration of separated solutions is prevented by means of a structure where the settled solution flows from the solution end via a shaft-like weir box positioned lower than the bottom of the solution end to the tubular lines. The prevention of aeration is important particularly for the extraction solution. Said weir box can also be provided with additional structures for avoiding the creation of vortexes and the absorption of air into the solution through them. The essential novel features of the invention are apparent from the appended patent claims.

BRIEF DESCRIPTION OF THE DRAWING

The invention is described in more detail with reference to the appended drawings, where FIG. 7b is a top-view illustration of the object of FIG. 7a.

DETAILED DESCRIPTION OF THE INVENTION

Figure 1:
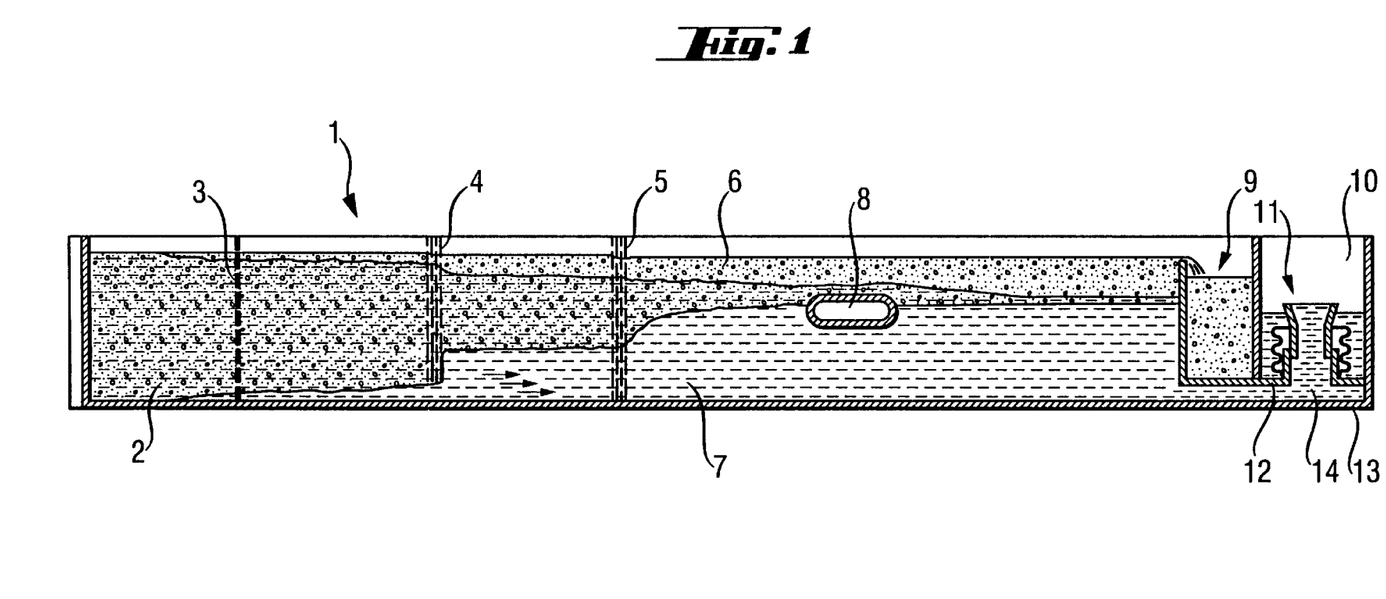
FIG. 1 is a schematical illustration of the cross-section of the separation part, i.e. of the settler, in the longitudinal direction.

FIG. 1 is a schematical illustration of the structure of the separation part, i.e. of the settler 1. A dispersion 2 of two different phases mixed in the mixing unit, i.e. the mixer (not illustrated in the drawing) flows into the settler which at its front end is provided with picket fences 3, 4 and 5. When flowing forward, the dispersion is gradually divided into two separate layers, an upper organic phase layer 6 and a lower aqueous solution layer 7. In between the phases, there remains a continuously thinning dispersion layer. Part of the aqueous solution can be removed into circulation from the settler after the last picket fence 5 through the collecting channel 8. The organic phase is removed from the settler as overflow to the chute 9 of the lighter phase, the front end of said chute being fixed, but advantageously rounded according to the drawing. The aqueous solution continues proceeding from underneath the organic phase chute to the water end 10 of the aqueous solution phase. The aqueous solution rises to the water end first through tubular members 11 and from inside them as overflow to the water end 10 proper.

Figure 2:
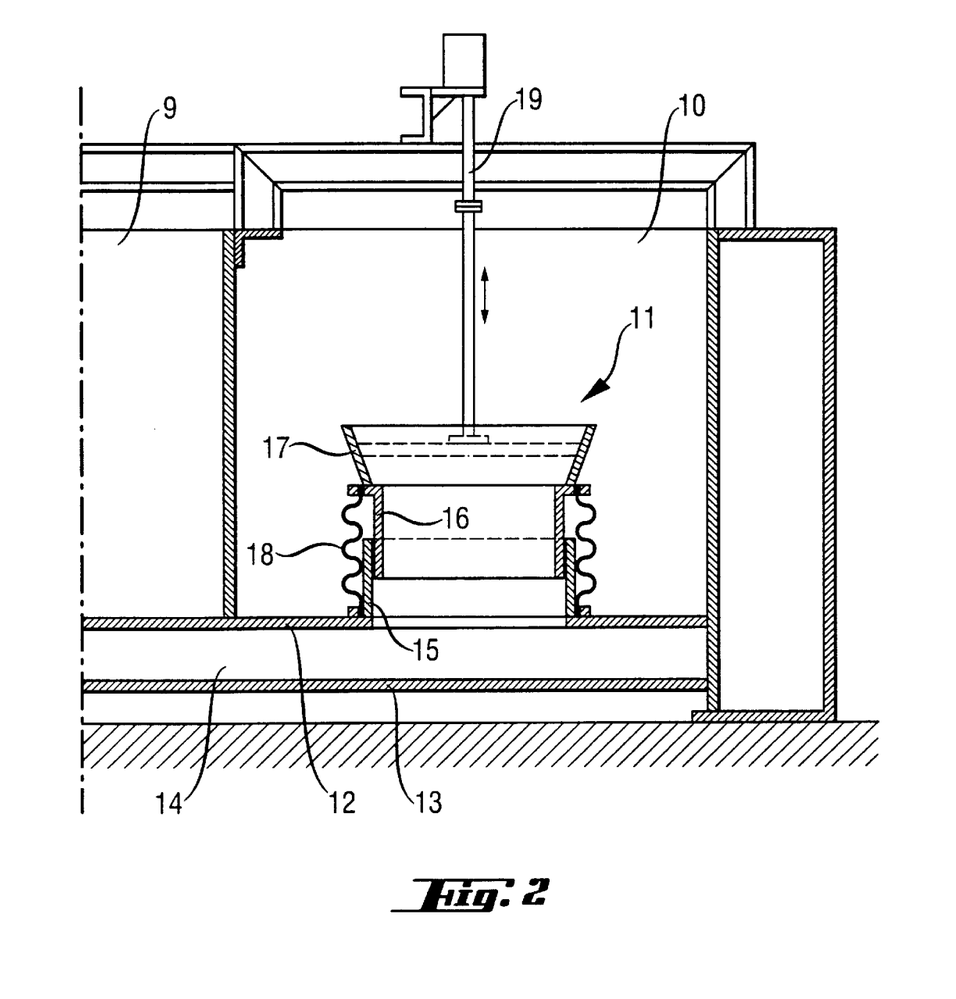
FIG. 2 illustrates the structure used for discharging the aqueous solution.

The advantageous discharge method of the aqueous solution according to the invention is described in more detail in FIG. 2. The aqueous solution flows through a duct 14 formed by the lower bottom 12 of the water end 10 and the settler bottom 13 to the lower tubular element 15 of the tubular member 11, which element 15 is telescopically connected to an upper tubular element 16. Advantageously the top edge 17 of the top element is constructed to be upwards expanding, so that the overflow speed can be reduced by means of this structure and the adjusting made even more accurate.

In order to connect the telescopically joined tubes 15 and 16 in a compact fashion, the structure can be further secured by attaching on the tube surfaces a bellow-like element 18 connecting the tubes to each other. The height of the bellow-like element is such that it enables the rising and lowering of the tubes in relation to each other throughout the length of the adjusting range. The lower element 15 of the overflow pipe 11 is compactly attached to the lower bottom 12. The lower bottom itself is advantageously located at the same height as the bottom of the organic solution discharge chute 9. By employing the method illustrated in the drawing, it is thus possible to adjust the height of the aqueous solution surface in an accurate and controlled manner without uncontrolled solution flows over the adjusting edge, and at the same time there is adjusted the height of the boundary surface between the solutions.

Figure 3:
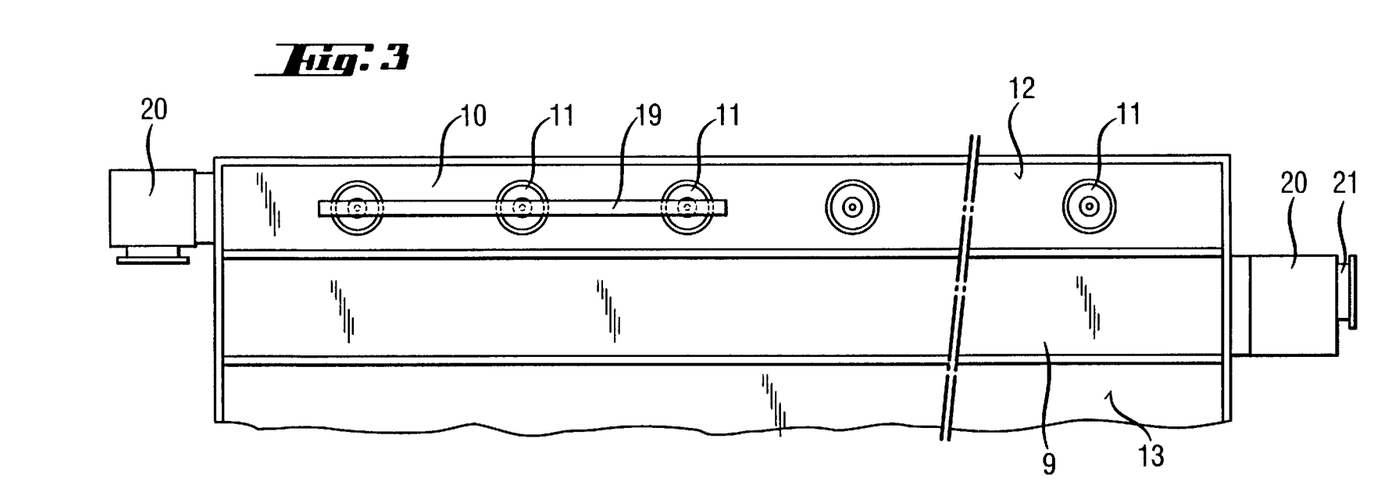
FIG. 3 is a top-view illustration of the discharge end of the settler.
Figure 4:
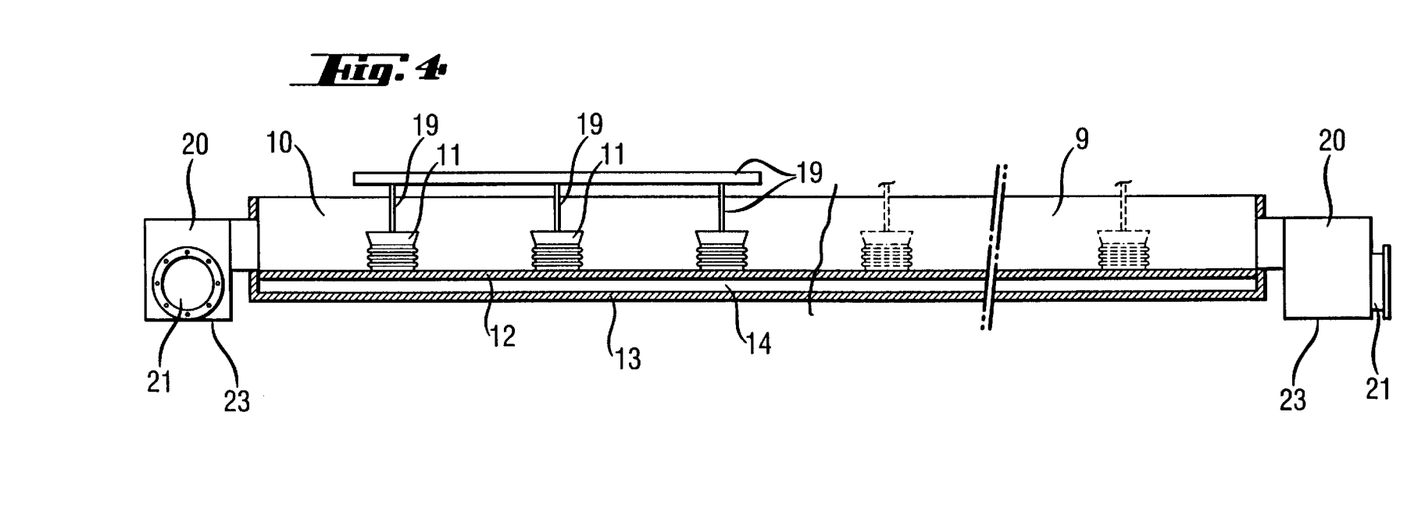
FIG. 4 shows the structure of the discharge end of the settler in cross-section.

FIG. 3 is a top-view illustration of the phase discharge end, in which case there is located, first in the flow direction, the organic phase discharge chute 9 and thereafter the water end 10 of the aqueous solution. In the drawing it is seen that the overflow height of the tubular members 11 can be adjusted in groups of several pieces by means of an adjusting bar 19. In the drawing, to the adjusting bar 19 there are connected three overflow pipes 11, but the number can naturally vary. In FIG. 4 the same phase discharge end is shown in cross-section. In between the overflow pipes, there are seen supporting structures of the discharge end.

In the discharge end of the settler, there is thus formed, according to the present invention, a uniform aqueous solution space 10, restricted, when seen in the flowing direction of the solutions, at the front end by the organic phase overflow chute 9, and at the final end by the rear end of the settler 1 and at the sides by the side walls of the settler. As is apparent for instance from FIG. 3, the overflow pipes 11 are located side by side in the water end 10. The number of the overflow pipes is adjusted to be such that the flow speed in the overflow pipes is set within the range 0.3–0.7 m/s.

Large copper extraction plants include process steps where the external feed of the aqueous solution into the step, and respectively the discharge of aqueous solution from the step, is remarkably smaller than the quantity of extraction solution flowing from one step to the next. Because the solution contact performed in the mixer between the organic and aqueous solution takes place roughly in a ratio 1:1, and still the aqueous solution feed from outside the step into the mixer is slight, the major part of the aqueous solution must be fed in through the settler part of the same step. In connection with FIG. 1, there was mentioned the collecting channel 8, through which the major part of the aqueous solution can advantageously be absorbed into circulation, and thus the aqueous solution needed in this recirculation does not charge the discharge end 10 of the aqueous solution. In that case the water end 10 is needed only for circulating the aqueous solution going to external recirculation. For instance in the extraction solution washing step the external supply of aqueous solution is of the order 50 $m^3/h$, although the aqueous solution supply into the mixer is of the order 1,000–2,000 $m^3/h$. In that case it is clear that the number of overflow pipes 11 required in the water end 10 is fairly small. It is likewise possible in corresponding cases to reduce the transversal area of the overflow chute without making the water end narrower.

Figure 5A:
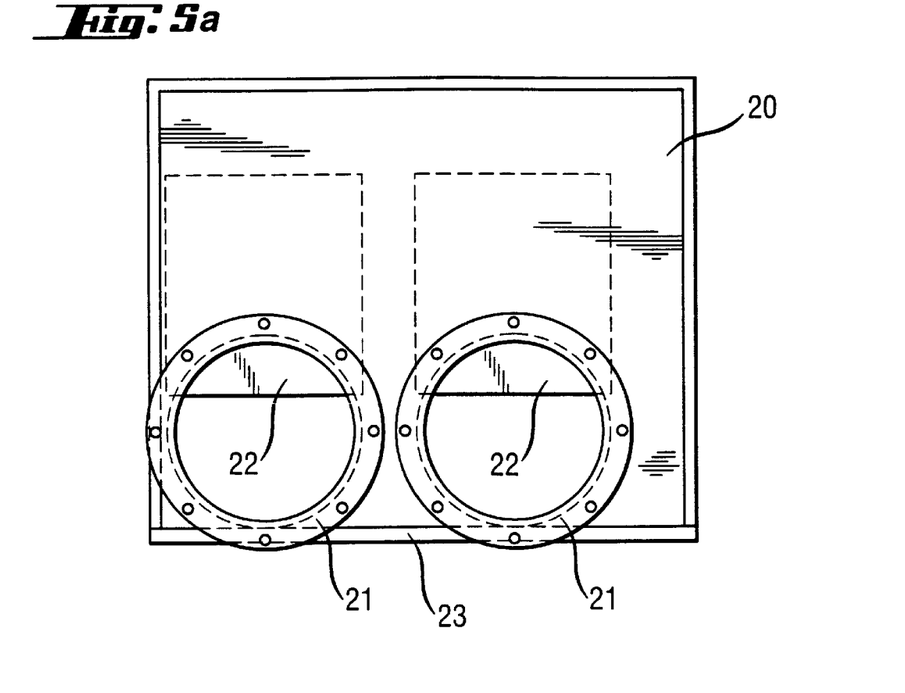
FIG. 5a illustrates the structure used for discharging the extraction solution in cross-section.
Figure 5B:
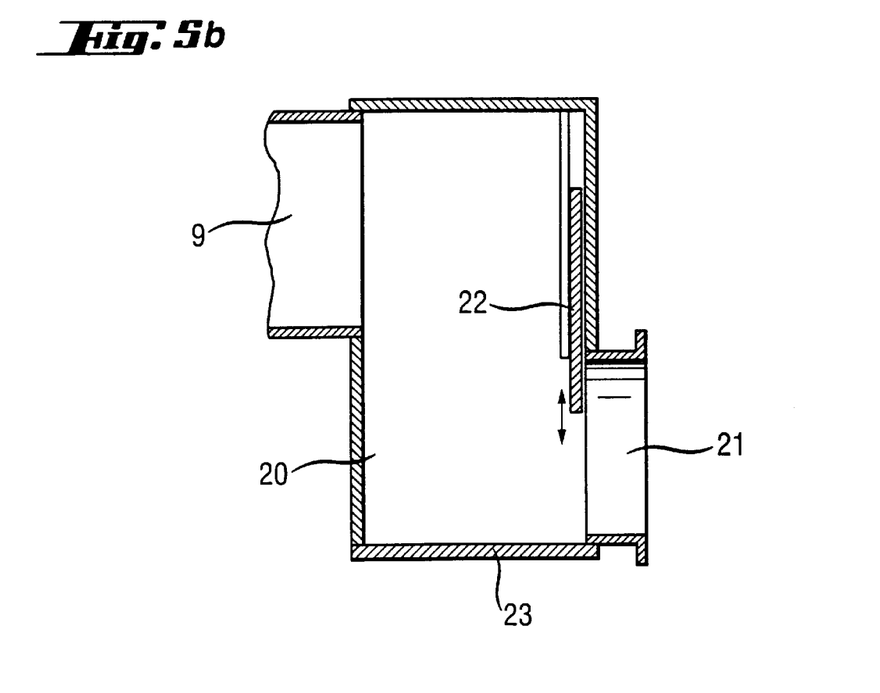
FIG. 5b is a side-view illustration of the same structure.

The removal of the separated solutions from the extraction solution chute and from the water end, and the conducting of the solutions to the next process step, is according to the invention arranged so that the solutions and particularly the extraction solution 6 are transferred to the next step by avoiding the aeration of the solution. In FIGS. 3 and 4 it is seen how the extraction solution chute 9 continues in the sideways direction in a way to outside the settler proper, and through this outer weir box 20 of said chute the solution is conducted to the next process point. According to FIGS. 5a and 5b, the weir box 20 of the extraction solution chute is in a shaft-like fashion deeper than the chute 9 itself, and an extraction solution transfer pipe 21 is connected thereto, at the bottom part of the weir box. Instead of one, the number of transfer pipes can be for instance two, in which case the construction of oversized circulation pipes is avoided. The two-pipe structure has the advantage that there are avoided situations where for example the bottom part of one large pipe of organic solution is filled with aqueous solution that can plug the proceeding of the extraction solution. The weir box of the extraction solution chute is advantageously located at either side of the settler, but the corresponding shaft-like weir box of the aqueous solution can be placed freely at the rear wall of the water end, or on either side of the side end of the water end 10.

As was mentioned above, the removal structure 20 of the aqueous solution can be located at different spots in the chute. The location depends on which step is in question and where the aqueous solution is conducted next. It is naturally sensible to place the removal point in a location where the number of transfer pipes to the next step is as small as possible. A shaft-like structure enables a horizontal outlet of the pipework connected to the structure on a level as high as possible, in which case pumping becomes easier and deep pipework excavations can be avoided. A remarkable advantage is already the fact that the pipes can be drawn on ground surface.

Figure 6A:
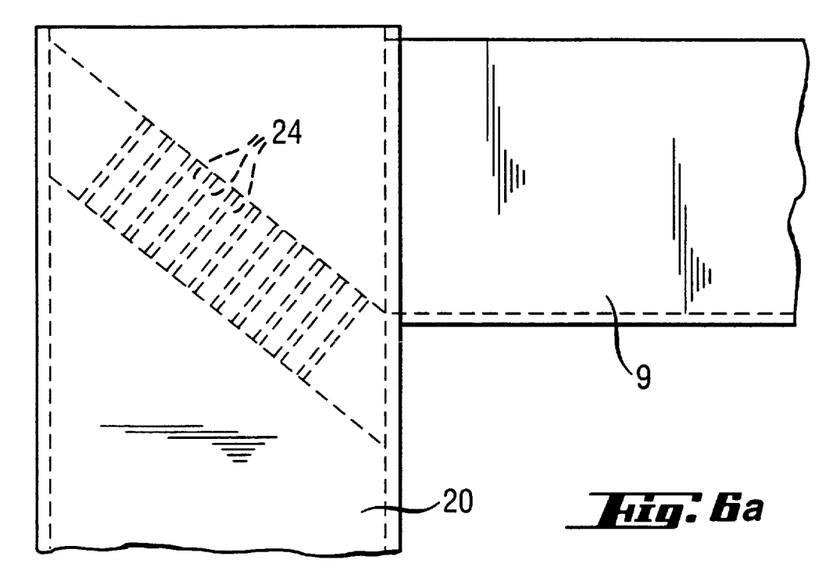
FIG. 6a is a schematical side-view illustration of a preferred embodiment of the same structure.
Figure 6B:
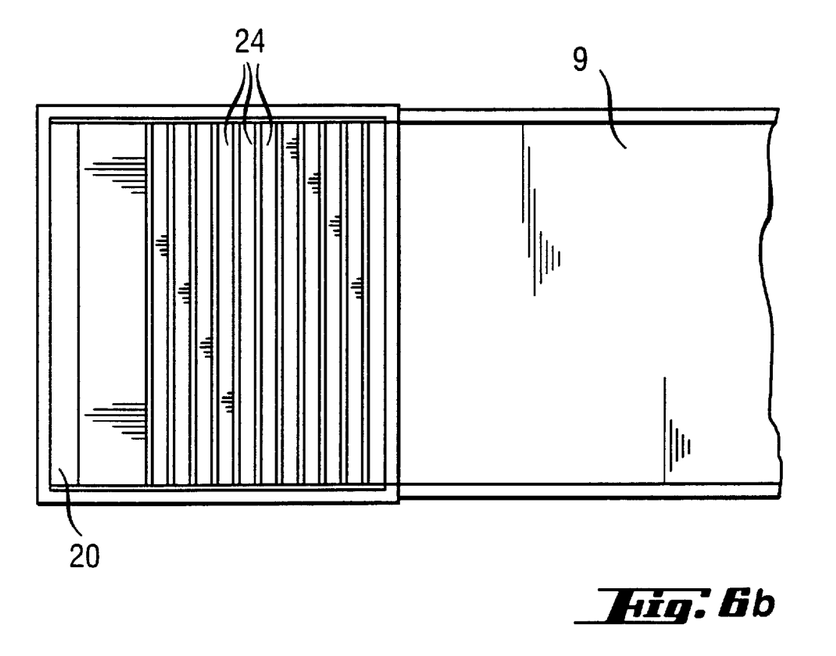
FIG. 6b is a top-view illustration of the same structure.

The shaft-like weir box 20 prevents air from entering the solution. In order to prevent air from entering, the structure can be further improved by providing the ceiling part of the weir box with downwardly oriented and essentially vertical plates 22 in front of each pipe outlet 21. It is in fact advantageous to install the plates so low that the extraction solution chute is nearly full, in which case the chute does not absorb air. Another additional preventive method for the absorption of air is a lattice channel 24 located in the vicinity of the liquid surface and illustrated in FIGS. 6. This obstacle is useful when driving with an incompletely filled extraction solution chute or water end and works in a circulation-attenuating fashion also in normal runs, which do not officially need said obstacles. The lattice channel 24 is arranged so that its top end extends to above the liquid surface, but it can also be located underneath the liquid surface, even as much as for the length of the lattice channel.

The use of the removal structure 20 prevents air from being absorbed into the solutions to be discharged. The structure is shaft-like, and the bottom 23 of the structure is located lower than the bottom of the solution chute, so that the height difference is 0.3–1.0 times the chute width.

Figure 7A:
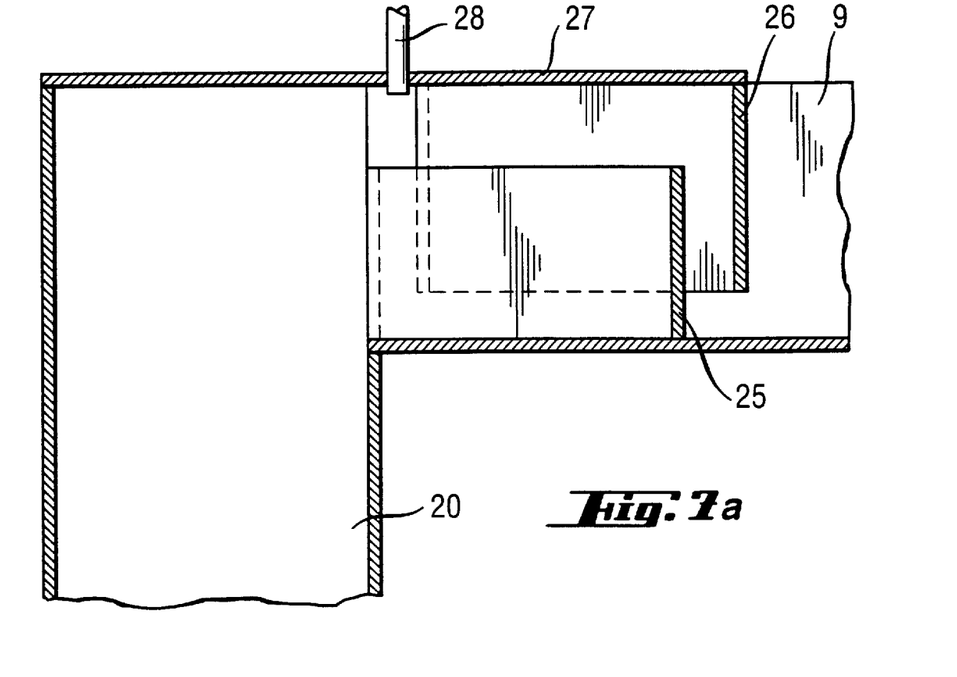
FIG. 7a illustrates the liquid seal used in the discharge of the extraction solution in cross-section.
Figure 7B:
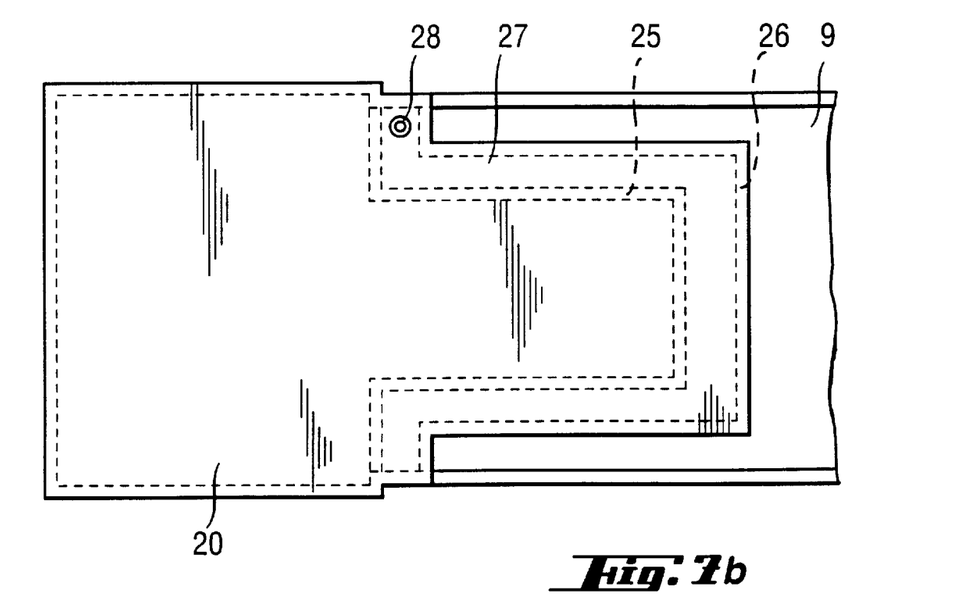

In large extraction plants, the extraction solution storage tank is generally located in a separate storage tank area, which is placed so low that the solutions are made to flow there by applying free release. This is often carried out with a drop of several meters, and leads to an intensive aeration of the solution. From FIGS. 7a and 7b it is seen how aeration can be prevented, particularly in pipeworks to be conducted into storage tanks by using a liquid seal, which is installed in the extraction chute 9, prior to the removal structure 20. The question is of an elongate overflow 25, which in a way forms a chute in the discharge chute, in the middle of the outlet end. Loosely around the overflow there is constructed a vertical plate 26 extending remarkably lower than the liquid surface. Advantageously these arise as far as the edge of the extraction solution chute, and from there starts a cover 27, illustrated in FIG. 7b, which continues towards the solution discharge direction and extends in a uniform shape over the discharge shaft 20, too. The pressure of the air space left underneath the cover is equalized by means of a vertical pipe 28 leading to this space.

The above described overflow to be conducted to the storage tank can be horizontal or evenly descending towards the incoming direction, while the lowest part is formed of the section crossing the extraction solution chute, and the topmost part of the overflow sections bordering the discharge shaft. From the point of view of flow technology, the latter solution is more recommendable, because it reduces the drop height of the overflow and thus limits the mixing of air into the extraction solution. However, the danger of mixing is clearly smaller when using a liquid seal described above.

In the above specification we have described the method and apparatus according to the invention mainly with reference to copper extraction, where large extraction plants are used, and attempted to find solutions to their problems. It is, however, clear that the method and apparatus can be applied to other extraction plants, too.

What is claimed is:

1. A method for adjusting the boundary surface between two mutually gravity separable solutions and conducting the separated solutions out of a discharge end of a settler where gravity separation takes place, which comprises introducing said solutions into a settler, allowing the solutions to separate by gravity, maintaining the height of a separated lighter solution constant, adjusting the height of a separated heavier solution by conducting said separated heavier solution upwardly through height adjustable tubular members, removing the separated solutions from the part of the settler where separation takes place so as to prevent aeration of said solutions by conducting said solutions to transfer pipes through covered weir boxes that are deeper than the discharge end of said settler.

2. A method according to claim 1, wherein the aeration of said solutions is prevented by turbulence-preventing plate structures arranged in the said weir boxes.

3. A method according to claim 1, wherein the aeration of said solutions is prevented by turbulence-preventing lattice structures arranged in the said weir boxes.

4. A method according to claim 3, wherein the lattice structure is installed so that its top edge is located above a liquid surface.

5. A method according to claim 3, wherein the lattice structure is installed so that its top edge is located beneath a liquid surface.

6. An apparatus for preventing aeration of two gravity separable liquid solutions obtained from a liquid—liquid extraction comprising a settler for separating said solutions of different densities, a lighter solution discharge chute, a weir box connected to said chute, said weir box having a top part and a bottom part, said weir box being deeper than said chute and the bottom part of said weir box being connected to a transfer pipe of the lighter solution, a heavier solution discharge end, a weir box connected to said discharge end and the bottom part of said weir box being connected to a transfer pipe of the heavier solution.

7. An apparatus according to claim 6, wherein said weir box connected to the extraction solution chute is in the sideways direction installed as a continuation of the extraction solution chute.

8. An apparatus according to claim 6, wherein said weir box connected to said heavier solution end is in the sideways direction installed as a continuation of said end or at the rear wall of said end.

9. An apparatus according to claim 6, wherein the number of the transfer pipes starting from said weir box is two.

10. An apparatus according to claim 6, wherein the ceiling part of said weir box, have downwardly protruding, vertical plates corresponding to the number of the transfer pipes.

11. An apparatus according to claim 6, wherein said weir box is provided with a lattice channel arranged in the vicinity of a liquid surface.

12. An apparatus for preventing aeration of two gravity separable liquid solutions obtained from a liquid—liquid extraction comprising a settler for separating said solutions of different densities, a lighter solution discharge chute, a weir box connected to said chute, said weir box having sidewalls, said weir box being deeper than said chute and a transfer pipe of said weir box being connected to a lower part of a sidewall of said weir box, a heavier solution discharge end, a weir box connected to said discharge end and a transfer pipe of the heavier solution connected to a lower part of a sidewall of said weir box.

\* \* \* \* \*

UNITED STATES PATENT AND TRADEMARK OFFICE
CERTIFICATE OF CORRECTION

PATENT NO.    : 6,267,900 B1
DATED         : July 31, 2001
INVENTOR(S)   : Nyman et al.

It is certified that error appears in the above-identified patent and that said Letters Patent is hereby corrected as shown below:

<u>Title page,</u>
Item [73], Assignee,
Line 1, "Outokumpu Technology Oyj" should read -- Outokumpu Technology Oy --

Signed and Sealed this

Twenty-sixth Day of February, 2002

Attest:

Attesting Officer

JAMES E. ROGAN
*Director of the United States Patent and Trademark Office*